July 12, 1966  D. E. HERRON  3,260,539
COUPLING FOR FLUID CONDUITS
Filed Feb. 10, 1965
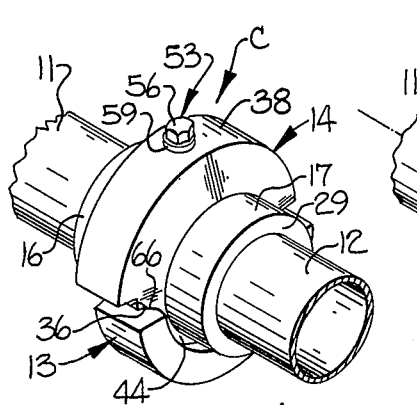
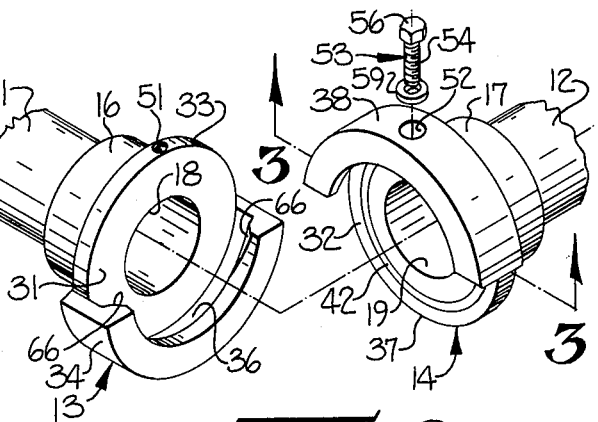
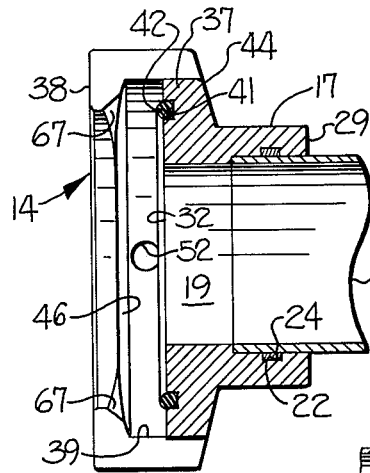
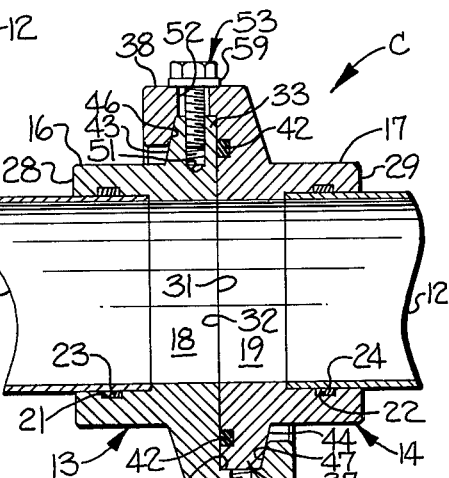
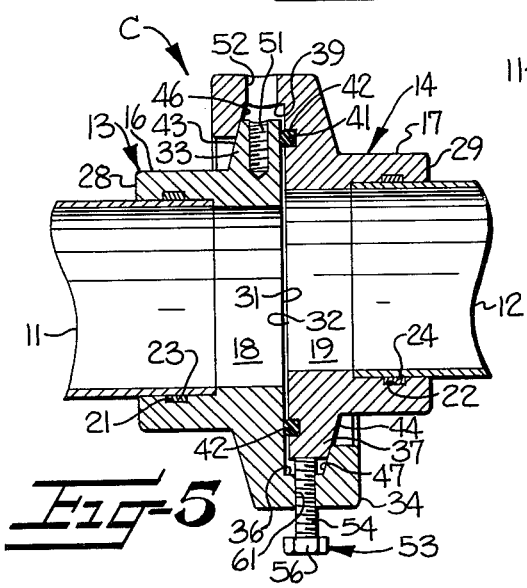
INVENTOR
DONALD E. HERRON
BY *T. Russell Foster*
ATTORNEY

United States Patent Office 3,260,539
Patented July 12, 1966

3,260,539
COUPLING FOR FLUID CONDUITS
Donald E. Herron, 22 Stark Lane, Charleston, S.C.
Filed Feb. 10, 1965, Ser. No. 431,661
2 Claims. (Cl. 285—24)

This invention relates to couplings and more particularly to a coupling for fluid conduits of the quick coupling and uncoupling type.

Various designs for couplings comprising two mating or complementary halves for interconnecting fluid conduits have been proposed. Such couplings are frequently referred to as the "quick disconnect" or "quick detachable" type and utilize substantially identical halves which have complementary portions to permit the halves to be coupled by a movement substantially perpendicular to the axis of the conduits to be interconnected. Gaskets are usually provided for such "split" couplings which serve in the conventional manner to provide a seal between the coupled halves.

While the gaskets for such couplings generally do provide the desired sealing action, it is usually the compressive force exerted by the parts of the coupling on the gasket which produces the desired degree of sealing by the gasket. However, the location of the gasket and its cooperation with the coupling parts in present day coupling constructions frequently result in a failure of the coupling to provide the desired sealing action particularly under conditions of high pressure, the presence of corrosive fluids, and other requirements of present day piping arrangements. As a result of certain design limitations in such couplings, either the full sealing effect of the gasket is not obtained or the coupling parts are prone to become misaligned so that the available gasket sealing effect is not obtained. In addition, the position of gasket relative to the coupling parts in some designs unduly exposes the gasket to the corrosive effects of the fluid moving in the conduit not only causing rapid deterioration of the gasket but producing undesirable eddy currents with attendant pressure loss in the fluid.

In present day piping installations where a large number of conduits are arranged together or where limited space is provided for a few conduits, the difficulty of connecting and disconnecting the halves of such split couplings is materially increased due to such crowded conditions. Such crowded piping installations not only produce limited visibility for the workmen but additionally limits the use of convenient tools for installing, coupling and uncoupling the halves. These conditions frequently result in improper alignment of the coupling halves and, on occasion, a limitation on the type of available couplings which can be used. Under such conditions, not only is the normal connecting and disconnecting of such couplings difficult to accomplish but if the coupling halves through long continuous use have become stuck together by corrosion and the like so that they may be broken apart only with considerable force, such cramped areas make an uncoupling operation extremely difficult if possible at all without damaging the coupling.

Accordingly, a primary object of this invention is to provide a new and novel coupling of the quick disconnect type.

Another object of this invention is to provide a new and novel coupling utilizing complementary coupling halves coupled by a movement perpendicular to the axis of the coupling which is completely sealed in the coupled condition even under unusually high fluid pressures.

A further object of this invention is to provide a new and novel coupling of the quick disconnect type for interconnecting fluid conduits which utilizes a gasket which completely seals the coupling with a minimum of exposure to the fluid in the conduits to reduce corrosion in the gasket and to eliminate eddy currents in the fluid.

Still another object of this invention is to provide a new and novel coupling of the quick disconnect type utilizing substantially identical complementary coupling halves and a gasket in which the halves may be simply and easily joined together and locked in the coupled position with a minimum of visibility and space with complete sealing by the gasket and which halves may be pried apart in a simple and easy manner regardless of the physical condition of the coupling.

This invention further contemplates the provision of a new and novel coupling for fluid conduits utilizing substantially identical complementary coupling halves which are composed of a minimum of parts, which halves are manufactured inexpensively in the same basic form, which halves may be easily coupled and uncoupled in a minimum of space, and which halves may be easily locked together in the coupled relationship with complete sealing by means of a gasket to interconnect conduits in which are conducted fluids of a wide variety of types and pressures.

Other objects and advantages of the invention will become apparent from the following description taken in connection with the accompanying drawing.

The objects stated above and other related objects in this invention are accomplished by providing a pair of complementary substantially identical coupling halves having axial bores each of which is connected to a fluid conduit. Each of the coupling halves has a face lying in a plane extending perpendicular to the axis of its bore and each of the coupling halves is provided with a flange and a portion having a recess on opposite sides of its face. The coupling halves are coupled together by a relative movement substantially perpendicular to the axis of the bores of the coupling halves with the flange on each coupling half being received within the recess on the other coupling half and with the faces in overlying relationship. Resilient sealing means such as an O-ring are positioned in the face of one of the coupling halves so as to be engaged by a substantially flat surface provided on the face of the other coupling half. Thus, when the halves are coupled together with the faces in overlying relationship, the O-ring is compressed by the flat surface to form a leakproof seal between the overlying faces of the coupled halves.

The novel features which are believed to be characteristic of the invention are set forth with particularity in the appended claims. The invention itself, however, both as to its organization and method of operation may be best understood by reference to the following description taken in conjunction with the accompanying drawing in which:

FIGURE 1 is an isometric view of the coupling of the invention shown in the installed position;

FIGURE 2 is an isometric view of the coupling of FIGURE 1 with the parts in the uncoupled condition;

FIGURE 3 is an enlarged sectional view taken substantially along line 3—3 of FIGURE 2 in the direction of the arrows;

FIGURE 4 is a sectional view of the coupling of FIGURE 1 showing the parts in the coupled position; and FIGURE 5 is a view similar to FIGURE 4 showing the coupling in partially uncoupled position.

Referring now to the drawing and to FIGURES 1, 2 in particular, there is shown a coupling constructed in accordance with the invention which is designated generally by the letter "C." The coupling C is of the type referred to as the "quick disconnect" or "quick detachable" type and is adapted to interconnect fluid conduits of any suitable type such as conduits 11, 12.

As specifically illustrative of the invention, the coupling C comprises a pair of complementary coupling halves 13, 14 which, except for certain features to be described hereinafter, are substantially identical in construction so as to permit each coupling half to be made in the same general form. Each of the coupling halves 13, 14 is provided wtih a tubular body 16, 17, having longitudinally extending axial bores 18, 19, respectively, as shown best in FIGURES 2, 4. Although any suitable connecting means may be provided for connecting each of the coupling halves 13, 14 to the fluid conduits 11, 12, the inner walls of the axial bores 18, 19 are provided with portions of enlarged diameter in which are formed annular grooves 21, 22 respectively. Thus, the conduits 11, 12 may be inserted into the outer ends of the tubular bodies 16, 17 and secured therein by suitable means such as silver solder 23, 24 respectively. It should be understood, that any suitable means may be provided for connecting the conduits 11, 12 to the coupling halves 13, 14 and as this forms no part of the invention, it will not be discussed further in any detail.

As shown in FIGURE 4, the tubular bodies 16, 17 of the coupling halves 13, 14 terminate in outer annular end walls 28, 29 respectively. The inner ends of the tubular bodies 16, 17 terminate in faces 31, 32 which lie in a plane substantially perpendicular to the axis of the bores 18, 19 respectively, as shown best in FIGURES 4 and 5.

In order to couple the halves together, each of the coupling halves 13, 14 is provided with a flange and a portion having a recess on opposite sides of its inner face. More specifically, coupling half 13 is provided with a substantially semi-circular flange 33 and a portion 34 having a substantially semi-circular recess 36. Coupling half 14 is similarly provided with a substantially semi-circular flange 37 and a portion 38 having a substantially semi-circular recess 39 as shown best in FIGURE 5. The flange and recessed portion on each coupling half is thus diametrically opposed as shown so that the flange on each coupling half is received within the recess on the other coupling half when the halves 13, 14 are coupled together by a relative movement in a direction substantially perpendicular to the axis of the bores 18, 19 and conduits 11, 12. This action is shown clearly in FIGURES 4, 5 wherein flange 33 on coupling half 13 is received within the recess 39 of coupling half 14 and flange 37 on coupling half 14 is received within recess 36 of coupling half 13. In this coupled position, the faces 31, 32 on coupling halves 13, 14 are positioned in overlying relationship.

Means are provided for sealing the coupling C to prevent escape of the fluid flowing in the conduits 11, 12. More specifically, the face 31 on coupling half 13 is provided with a substantially flat surface. In the preferred embodiment both faces 31, 32 are planar so the entire surface of face 31 is flat. Resilient sealing means are provided on the face 32 of the coupling half 14 which sealing means are arranged to be engaged and compressed by the flat surface of face 31 in the coupled position of the halves 13, 14. More specifically, the face 32 of coupling half 14 is provided with an annular recess or groove 41 positioned radially inward from the marginal edge of the face 32 in which is positioned an O-ring 42.

Means are also provided on the flange and recessed portion of each of the coupling halves 13, 14 for camming the faces 31, 32 respectively into the overlying relationship of FIGURE 4 to compress the O-ring 42. More specifically, beveled surfaces 43, 44 are provided on the sides of flanges 33, 37 of coupling halves 13, 14 opposite the faces 31, 32 respectively. Corresponding beveled surfaces 46, 47 are provided on the surface of the recesses 39, 36 of coupling halves 14, 13 opposite the faces 32, 31 respectively.

Means are provided for drawing and locking the coupling halves 13, 14 together in the coupled relationship of FIGURES 1, 4. More specifically, the flange 33 of coupling half 13 is provided with a radially extending threaded hole 51 as shown best in FIGURE 4. The recessed portion 38 of coupling half 14 is provided with a radially extending opening 52 somewhat enlarged which substantially aligns with the threaded hole 51 when the halves are moved together into coupling engagement as shown in FIGURES 4, 5. A threaded bolt 53 having a threaded shank 54 and a hex head 56 is arranged to be inserted through the opening 52 in loose fitting relationship therewith together with a washer 59 with its shank 54 in threaded engagement with the hole 51 and its head 56 in engagement with the outer surface of the recessed portion 38 to draw and lock the parts together as shown in FIGURE 4. As can be understood, the diameter of the opening 52 in portion 38 of coupling half 14 is selected to permit the bolt 53 to be received within the hole 51 when the halves are in an intermediate coupling position such as is shown in FIGURE 5.

Means are also provided on the coupling C for forcing the coupling halves 13, 14 apart from the coupled condition to any partially or completely uncoupled position. More specifically, the recessed portion 34 of coupling half 13 is provided with a radially extending threaded opening 61 which is arranged to receive a threaded bolt such as the bolt 53. It should be understood that any suitable threaded bolt may be used for the purpose shown in FIGURE 5. However, the use of bolt 53 is preferred for convenience and as it must be removed or at least loosened prior to prying the coupling halves apart, the end of the threaded shank 54 of bolt 53 is thus adapted to engage the peripheral surface of the semi-circular flange 37 on coupling half 14 when the bolt 53 is screwed into the opening 61.

It can be understood that the inner peripheral edge of flange 33 on coupling half 13 would normally tend to engage the inner compressed O-ring 42 as the couplings are moved into the coupling position with resultant damage to the O-ring by cutting or the like. Clearance means are therefore provided on the coupling halves 13, 14 which permit the coupling halves to be moved together into an intermediate coupling position with the face 31 on coupling half 13 overlying the O-ring 42. With this movement, the flange 33 initially clears the O-ring with the O-ring remaining in an uncompressed condition. More specifically, the edges of the recessed portions 34, 38 of coupling halves 13, 14 are cut away at 66, 67, as shown in FIGURES 2, 3, to provide clearance for the flanges 33, 37 respectively as the coupling halves are moved into an intermediate coupling position such as that shown in FIGURE 5. With the clearance surfaces 66, 67, the face 31 on coupling half 13 is positioned in overlying relationship with the O-ring 42 without damage to and without compressing the O-ring. The coupling halves 13, 14 can then be moved together into the coupled relationship of FIGURE 4.

When it is desired to interconnect the conduits 11, 12 together using the coupling C, the coupling halves of which having been attached to the conduits as previously described, coupling half 13 without the bolt 53 and coupling half 14 containing O-ring 42 are moved together in a direction substantially perpendicular to the axis of the conduits 11, 12 and the bores 18, 19 of the coupling halves. During this coupling movement, flange 33 on coupling half 13 is received within recess 39 on coupling half 14 and flange 37 on coupling half 14 is received within recess 36 on coupling half 13.

As a result of the clearance surfaces 66, 67 on coupling halves 13, 14 respectively, the face 31 overrides the O-ring 42 so that the face 31 overlies the O-ring with the O-ring remaining in an uncompressed condition as shown best in FIGURE 5. Continued movement of the coupling halves 13, 14 together from the position of FIGURE 5 produces engagement between the camming surfaces 43, 46 and 44, 47 on the coupling halves so that the coupling halves are moved into substantially the coupled position of FIGURE 4 with the faces 31, 32 in overlying relationship and the O-ring 42 compressed into sealing engagement between the overlying faces.

The coupling halves may then be drawn into the coupled position of FIGURE 4 and locked therein by means of the threaded bolt 53 which together with the washer 59 is inserted through the opening 52 in the recessed portion 38 of coupling half 14 and into threaded engagement with threaded hole 51 in the flange 33 of coupling half 13. The coupling halves 13, 14 are thus locked together as shown in FIGURES 1, 4 and complete sealing to the fluid flowing in the conduits 11, 12 is provided by the compressed O-ring 42.

When it is desired to uncouple the coupling halves 13, 14, the threaded bolt 53 may be easily removed from the threaded hole 51 and threadedly engaged with the threaded opening 61 in the recessed portion 34 of coupling half 13 as shown in FIGURE 5. Rotation of the threaded bolt 53 engages its inner end with the flange 37 on coupling half 14 so that the coupling halves are dislodged and forced into the intermediate uncoupled position of FIGURE 5 for easy disconnection.

It can be seen that there has been provided with the novel construction of this invention a coupling of the "quick disconnect" type for interconnecting fluid conduits which is not only inexpensive to manufacture but which contains a minimum of parts the fitting together of which may be accomplished in a simple and easy manner. The substantially identical coupling halves forming the coupling of the invention may be coupled together and uncoupled in a minimum of space with a minimum of visibility or even no visibility whatsoever making the coupling highly desirable for piping installations where space is at a premium. An outstanding feature of the invention is the provision of a gasket which not only provides complete sealing to the fluid conducted through the conduits on which the coupling is installed but the gasket is located remotely from this fluid thereby virtually eliminating gasket corrosion by the fluid as well as eliminating any tendency of the gasket to set up eddy currents in the fluids.

The novel construction of the coupling prevents misalignment of the parts which might produce leaking and only a minimum of skill is required for installation of the coupling as proper assembly of the coupling halves and proper compression of the gasket is assured by the interfitting complementary coupling parts and the novel drawing and locking means by means of which the coupling halves are locked together in the properly coupled condition. In addition, separation of the coupling halves, regardless of the degree of force required, may be easily accomplished by utilizing a part employed for assembling the coupling halves and the uncoupling operation, using the novel uncoupling means of the invention, may be accomplished also in a minimum of space with a minimum of effort.

While there has been described what at present is considered to be the preferred embodiment of the invention, it will be understood by those skilled in the art that various changes and modifications may be made therein without departing from the invention and, therefore, it is the aim of the appended claims to cover all such changes and modifications as fall within the true spirit and scope of the invention.

Having thus described the invention, what is claimed is:

1. A coupling for interconnecting fluid conduits comprising, in combination, a pair of complementary coupling halves having longitudinally extending axial bores each arranged to be connected to a fluid conduit, each of said coupling halves having a planar face extending substantially perpendicular to the axis of said bores, a radially extending arcuate flange of substantially 180 degrees and an opposed radially and axially extending portion of substantially 180 degrees having an internal recess and formed as mating complementary pairs for mating engagement in a direction substantially perpendicular to the axis of said bores to couple said halves together, said pairs of flanges and recessed portions having mutually engageable radially extending camming surfaces for camming said coupling halves into said coupled relationship with said planar faces in overlying engagement, a substantially flat surface on one of said faces, an annular groove on the other of said faces, an annular sealing member of resilient material positioned within said annular groove, said annular sealing member in said groove normally projecting outwardly from said grooved face for engagement with the flat surface on said one face, said groove having a cross-sectional area of a size sufficient to completely accommodate said annular sealing member in a compressed state when said faces are positioned in said overlying engagement, and means for drawing and locking said halves together into said coupling relationship with sliding engagement between said camming surfaces to force said faces into said overlying engagement and compress said annular sealing member to form a leakproof seal between said coupling halves.

2. A coupling in accordance with claim 1 wherein said drawing and locking means include a threaded, radially extending opening in the peripheral surface of the flange on one of said coupling halves, a radially extending opening in the recessed portion of the other of said coupling halves arranged for radial alignment with said threaded opening when said halves are in said coupled relationship and a threaded bolt extending through said radially extending opening for threaded engagement with said underlying threaded opening.

References Cited by the Examiner

UNITED STATES PATENTS

| | | | |
|---|---|---|---|
| 1,581,064 | 4/1926 | Kelley | 285—325 |
| 1,739,131 | 12/1929 | Eick | 285—67 |
| 2,933,334 | 4/1960 | Moude | 285—325 X |
| 3,099,060 | 7/1963 | Smith | 285—367 X |

FOREIGN PATENTS

| | | |
|---|---|---|
| 986,224 | 3/1965 | Great Britain. |

CARL W. TOMLIN, *Primary Examiner.*

T. A. LISLE, *Assistant Examiner.*